(12) United States Patent
Koga

(10) Patent No.: US 10,043,314 B2
(45) Date of Patent: Aug. 7, 2018

(54) DISPLAY CONTROL METHOD AND INFORMATION PROCESSING APPARATUS

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 15/062,498

(22) Filed: Mar. 7, 2016

(65) Prior Publication Data

US 2016/0284131 A1    Sep. 29, 2016

(30) Foreign Application Priority Data

Mar. 26, 2015    (JP) ................................. 2015-064263

(51) Int. Cl.
*G06F 3/00*    (2006.01)
*G06T 19/00*    (2011.01)
*G06T 19/20*    (2011.01)
*G06F 1/16*    (2006.01)
*G06F 3/01*    (2006.01)

(52) U.S. Cl.
CPC ............ *G06T 19/006* (2013.01); *G06F 1/163* (2013.01); *G06F 3/011* (2013.01); *G06T 19/20* (2013.01)

(58) Field of Classification Search
None
See application file for complete search history.

(56) References Cited

U.S. PATENT DOCUMENTS

| 7,787,706 | B2 * | 8/2010 | Yee | G06F 3/0425 345/211 |
| 8,817,047 | B1 * | 8/2014 | Lee | G09G 3/003 345/632 |
| 2009/0177644 | A1 * | 7/2009 | Martinez | G06F 17/30864 |
| 2014/0225919 | A1 | 8/2014 | Kaino et al. | |
| 2015/0016712 | A1 * | 1/2015 | Rhoads | G06K 9/00208 382/154 |

FOREIGN PATENT DOCUMENTS

JP    2013-92964    5/2013

OTHER PUBLICATIONS

English Abstract of Japanese Patent Publication No. 2013-92964 published Aug. 14, 2014.

* cited by examiner

*Primary Examiner* — Yingchun He
(74) *Attorney, Agent, or Firm* — Staas & Halsey LLP

(57) ABSTRACT

A display control method is executed by a computer. The display control method includes acquiring an image captured by a camera; displaying first object data corresponding to a reference object on a screen, when an image of the reference object is detected as being included in a first range in the captured image; and transitioning to a mode of continuously displaying the first object data corresponding to the reference object, when the image of the reference object is continuously detected as being included in a second range in the captured image for a predetermined time, even after the image of the reference object is no longer detected as being included in the first range in the captured image.

5 Claims, 14 Drawing Sheets

FIG.3A

| SCENARIO ID | SCENARIO NAME |
|---|---|
| 1 | ○○ FACTORY INSPECTION |
| 2 | △△ FACTORY INSPECTION |
| 3 | ×× FACTORY INSPECTION |
| ... | ... |

FIG.3B

| PARENT SCENARIO ID | SCENE ID | SCENE NAME | RECOGNITION FRAME ID |
|---|---|---|---|
| 1 | 1 | ○○ FACILITY INSPECTION | 1 |
| 1 | 2 | △△ FACILITY INSPECTION | 2 |
| 1 | 3 | ×× FACILITY INSPECTION | 3 |
| 2 | 1 | □□ FACILITY INSPECTION | 1 |
| 3 | 1 | ◇◇ FACILITY INSPECTION | 2 |
| ... | ... | ... | ... |

FIG.3C

| PARENT SCENARIO ID | PARENT SCENE ID | MARKER ID | AR CONTENT ID | COORDINATE VALUES | ROTATION ANGLE | MAGNIFICATION/ REDUCTION RATIO | TEXTURE PATH |
|---|---|---|---|---|---|---|---|
| 1 | 1 | | 1 | (Xc1,Yc1,Zc1) | (Xr1,Yr1,Zr1) | (Xs1,Ys1,Zs1) | http://xxx.png |
| 1 | 1 | | 2 | (Xc2,Yc2,Zc2) | (Xr2,Yr2,Zr2) | (Xs2,Ys2,Zs2) | http://yyy.png |
| 1 | 1 | | 3 | (Xc3,Yc3,Zc3) | (Xr3,Yr3,Zr3) | (Xs3,Ys3,Zs3) | http://zzz.png |
| 1 | 2 | | 4 | (Xc4,Yc4,Zc4) | (Xr4,Yr4,Zr4) | (Xs4,Ys4,Zs4) | http://aaa.png |
| 1 | 3 | 1 | 5 | (Xc5,Yc5,Zc5) | (Xr5,Yr5,Zr5) | (Xs5,Ys5,Zs5) | http://bbb.png |
| 2 | 1 | 2 | | (Xc6,Yc6,Zc6) | (Xr6,Yr6,Zr6) | (Xs6,Ys6,Zs6) | http://ccc.png |
| 3 | 1 | | | (Xc7,Yc7,Zc7) | (Xr7,Yr7,Zr7) | (Xs7,Ys7,Zs7) | http://ddd.png |
| ... | ... | ... | ... | ... | ... | ... | ... |

FIG.3D

| RECOGNITION FRAME ID | RECOGNITION FRAME COORDINATES |
|---|---|
| 1 | X1:(x1,y1),X2:(x2,y2),X3:(x3,y3),X4:(x4,y4) |
| 2 | X1:(x5,y5),X2:(x6,y6),X3:(x7,y7),X4:(x8,y8) |
| 3 | X1:(x9,y9),X2:(x10,y10),X3:(x11,y11),X4:(x12,y12) |
| ... | ... |

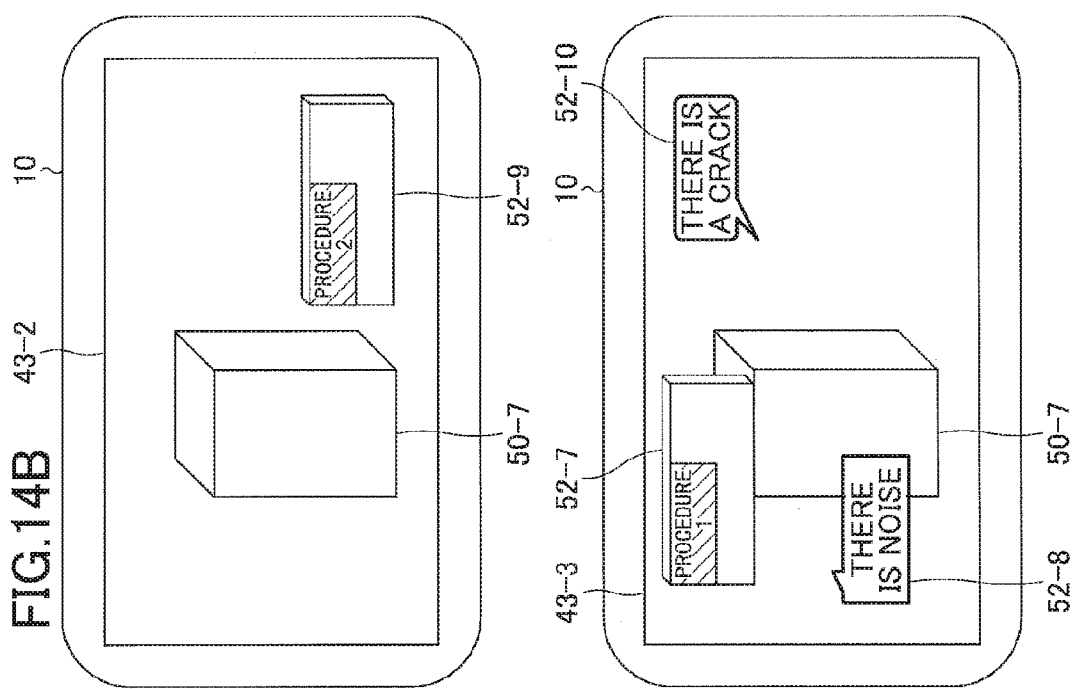
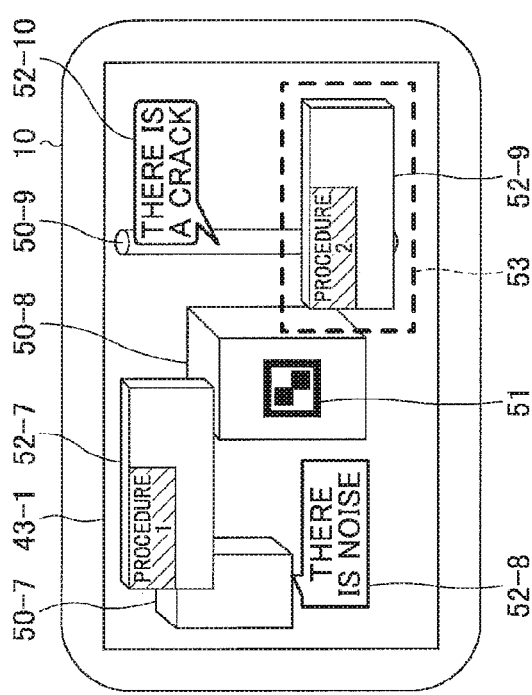

DISPLAY CONTROL METHOD AND INFORMATION PROCESSING APPARATUS

CROSS-REFERENCE TO RELATED APPLICATION

This patent application is based upon and claims the benefit of priority of the prior Japanese Patent Application No. 2015-064263 filed on Mar. 26, 2015, the entire contents of which are incorporated herein by reference.

FIELD

The embodiments discussed herein are related to a display control method and an information processing apparatus.

BACKGROUND

The Augmented Reality (AR) technology is known, in which object data is displayed by being superimposed on part of an image captured by an imaging device such as a camera.

In the conventional AR technology, for example, a terminal acquires position information and identification information (marker ID) with respect to a reference object (image data), such as an AR marker, etc., recognized in a captured image. Then, the terminal acquires AR content information including object data and arrangement information associated with the marker ID. Furthermore, the terminal estimates the positional relationship between the marker and the camera, based on the size and the shape (distortion) of the acquired marker area, determines the arrangement (position, orientation, etc.) of the object data by using the estimated positional relationship, and displays the object data by superimposing the object data on the captured image according to the determined arrangement.

Conventionally, instead of displaying object data associated with an AR marker as described above, object data, etc., is displayed with respect to an image of a real object captured by a terminal, by superimposing the object data on a screen, based on coordinates (x, y, z) in a three-dimensional orthogonal coordinate system corresponding to position information (latitude, longitude, altitude) obtained by a predetermined positioning method such as the Global Positioning System (GPS), etc., and the orientation information of the terminal.

The above-described AR technology is not only applied to a terminal in which the screen is easily operated by the user such as a tablet terminal and a smartphone, but also to a wearable computer such as a head mounted display (HMD), an eyeglass type display, etc. In HMD, etc., the object data is displayed in a transmission type screen that is fixed at the position of the eyes of user, such that the object data is displayed in association with a real object, etc., within the eyesight of the user.

Furthermore, conventionally, there have been cases where, even when the AR marker, which has been recognized in the image, is not recognized any longer, but the user desires to continue displaying the corresponding object data. In this case, the user operates the screen to continue displaying the AR content, even when the AR marker is not recognized.

Patent Document 1: Japanese Laid-Open Patent Publication No. 2013-92964

SUMMARY

According to an aspect of the embodiments, a display control method is executed by a computer, the display control method including acquiring an image captured by a camera; displaying first object data corresponding to a reference object on a screen, when an image of the reference object is detected as being included in a first range in the captured image; and transitioning to a mode of continuously displaying the first object data corresponding to the reference object, when the image of the reference object is continuously detected as being included in a second range in the captured image for a predetermined time, even after the image of the reference object is no longer detected as being included in the first range in the captured image.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 3A through 3D illustrate examples of various kinds of data applied in an embodiment;

FIGS. 14A through 14C illustrate an example of a screen of the display control process according to an embodiment (part 4).

DESCRIPTION OF EMBODIMENTS

Depending on the status of the user, there may be cases where the user is unable to directly operate the screen of the terminal even when the user desires to continuously display the object data, because another device is operated. Furthermore, for example, in a case where a screen is displayed by using a wearable computer, the user is unable to directly operate the screen, and is only able to perform limited operations by gestures, etc.

Preferred embodiments of the present invention will be explained with reference to accompanying drawings.

<Example of Functional Configuration of Information Processing Apparatus>

Figure 1:
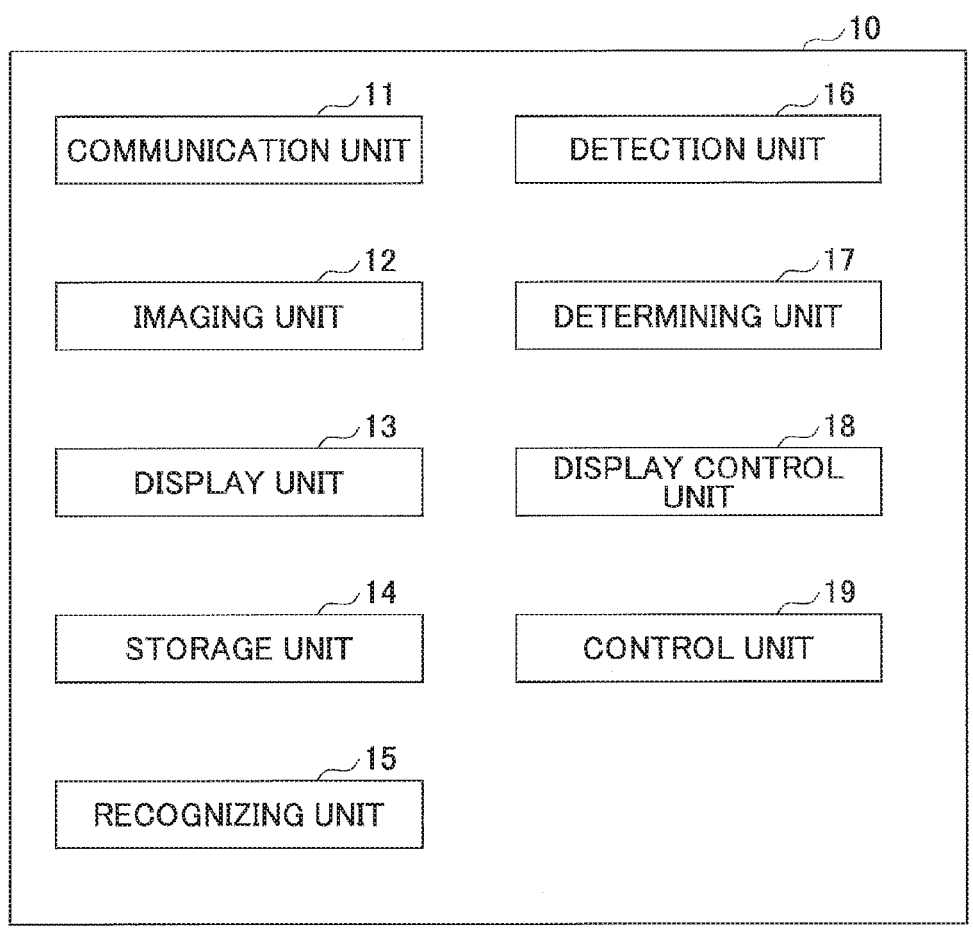
FIG. 1 illustrates an example of a functional configuration of a terminal.

An example of a functional configuration of a terminal, which is an example of an information processing apparatus according to the present embodiment, is described with reference to a figure. FIG. 1 illustrates an example of a functional configuration of a terminal. A terminal 10 illustrated in FIG. 1 includes a communication unit 11, an imaging unit 12 (image acquiring unit), a display unit 13, a storage unit 14, a recognizing unit 15, a detection unit 16, a determining unit 17, a display control unit 18, and a control unit 19.

The communication unit 11 is connected to an external device, which is connected via a communication network such as the Internet, a Local Area Network (LAN), etc., in a state where the communication unit 11 is able to transmit and receive data with the external device. For example, the communication unit 11 acquires AR content information from a management server, etc., connected via a communication network. The AR content information includes object data to be superimposed on a captured (photographed) image or to be displayed on a screen of the display unit 13, and the position information of the object data (coordinate values, rotation angle, magnification/reduction ratio). For example, the object data is model data, etc., of an object arranged in a three-dimensional virtual space corresponding to the real space, and for example, the object data is to be displayed by being superimposed on an image captured by the imaging unit 12. The object data may be in various modes, such as text, an icon, animation, a mark, a design, an image, a video, etc.

Furthermore, the communication unit 11 may perform short-range communication with a computer such as another terminal 10, etc., by using a communication method such as infrared communication, Wi-Fi (registered trademark), Bluetooth (registered trademark), etc.

The imaging unit 12 captures images at fixed frame intervals, and generates image data. For example, the imaging unit 12 is a digital camera, etc.; however, the imaging unit 12 is not so limited. Furthermore, the imaging unit 12 may be built in the terminal 10, or may be an external device that may be connected to the terminal 10. When the imaging unit 12 is mounted, the orientation information, such as the tilt and the direction, etc., of the imaging unit 12 is preferably operated integrally with the terminal 10; however, the imaging unit 12 is not so limited. Furthermore, the imaging unit 12 may acquire image data captured by an external imaging device, etc. In this case, the position information and orientation information of the imaging device are preferably included; however, the imaging unit 12 is not so limited.

The display unit 13 displays the captured image acquired from the imaging unit 12 on a screen, and displays a composite image in which object data is superimposed on the captured image. Furthermore, the display unit 13 displays a menu screen and a setting screen that are set in advance for performing a display control process according to the present embodiment, and an operation screen, etc., for operating the terminal 10. Furthermore, the display unit 13 may be used as a touch panel, etc., for inputting information from the screen.

The storage unit 14 stores various kinds of information needed in the present embodiment. For example, the storage unit 14 may write and read information, by the control of the control unit 19, etc. For example, the storage unit 14 stores, for example, an AR content table for managing AR content information, a scenario management table and a scene management table for distinguishing the contents, a recognition frame management table, various kinds of setting information other than the above, etc.; however, the stored contents are not so limited. Furthermore, the above kinds of information may be information acquired from a management server, etc., or information set by the user from the terminal 10.

The recognizing unit 15 detects (recognizes) that an image of a reference object such as an AR marker is included in a predetermined range (first range) of the captured image that has been acquired. Furthermore, the recognizing unit 15 detects (recognizes) whether an image of a reference object such as an AR marker is included in a predetermined range (second range) in the captured image that has been acquired (for example, in a recognition frame, etc.). Note that, for example, the first range and the second range described above may be the same range, or the second range may be part of the first range.

Here, an AR marker is a sign for specifying, for example, the contents of various kinds of content information including an object data, etc., and the position where the information is to be displayed, etc. An AR marker is, for example, an image, an object, etc., in which a predetermined design, a character pattern, etc., are formed in a predetermined area, such as a two-dimensional code; however, the AR marker is not so limited.

An example of a reference object is not limited to an AR marker; the reference object may be a real object such as a wall clock, a painting, a figurine, etc. In this case, the reference object is recognized by identifying a real object by comparing feature information corresponding to the shape, color, design, etc., of the real object, with feature information of each reference object set in advance. Then, identification information (ID) corresponding to the real object may be used as a marker ID described above.

Furthermore, the recognizing unit 15 recognizes whether to display object data by superimposing object data on a position range that may be acquired from an image captured by the imaging unit 12 (or terminal 10), based on the position information, the orientation information, the imaging range, the display range of object data set in the present embodiment, etc., of the imaging unit 12 (or terminal 10).

The recognizing unit 15 may determine whether an image is a target for displaying object data, by continuously performing recognition for a predetermined time with respect to a captured image. Note that the time information may be managed by an internal clock managed in the control unit 19, or the time information may be managed by a predetermined number of image frames (video) by using the number of frames with respect to the captured image as a reference.

The detection unit 16 acquires the position information and the orientation information of the imaging unit 12 (or the terminal 10), for example, by using one or more positioning methods. The positioning method of the position information is, for example, GPS, and may acquire position information (latitude, longitude, altitude) from the position of a WiFi network (for example, a router), a mobile network (for example, a base station), etc., to which the terminal 10 is connected; however, the positioning method is not so limited. Furthermore, when the detection unit 16 is connected to a plurality of Wi-Fi networks and mobile networks at the same time, the position information of the terminal 10 may be acquired by using an average value of the respective position information items or the position information of a router or base station having the maximum reception intensity.

Furthermore, as the positioning method of the orientation information, for example, an electronic compass, a gyro sensor, etc., may be used to acquire the orientation (azimuth direction) information (pitch, azimuth, roll), etc.; however, the positioning method is not so limited. For example, the electronic compass is an example of a geomagnetic sensor, a azimuth sensor, etc., which may acquire the orientation information by detecting the earth magnetism in a two-dimensional or three-dimensional manner and determining which direction the terminal 10 or the imaging unit 12 is facing with respect to the earth magnetism. Furthermore, a gyro sensor may acquire the orientation information by detecting that the terminal 10 or the imaging unit 12 is rotating or detecting that the orientation of the terminal 10 or the imaging unit 12 has changed.

The detection unit 16 periodically acquires the above-described position information and orientation information. Furthermore, the detection unit 16 may detect the imaging range (angular field information) obtained by various sensors, the imaging unit 12, etc.

The determining unit 17 determines whether an operation received from the user is a predetermined operation, when object data is superimposed on a captured image being displayed on the screen of the display unit 13 (when object data is displayed). A predetermined operation is an operation performed with respect to an image of an AR marker or object data; however, the predetermined operation is not so limited.

Furthermore, the determining unit 17 determines whether the detection of an image of an AR marker in a predetermined image (second range) in the captured image, has continued for a predetermined time. As the predetermined time, time information may be used, or a number of frames of captured images may be used. Furthermore, the determining unit 17 determines whether the position associated with the object data is included in an area, which is identified according to the position and the orientation of the terminal 10 detected by the detection unit 16.

The display control unit 18 acquires AR content information corresponding to an AR marker, for example, when the recognizing unit 15 determines that an image of the AR marker is included in a predetermined range (first range) of a captured image, and displays the object data included in the acquired AR content information by superimposing the object data on a predetermined position by using the AR marker in the captured image as a reference, based on the position information of the object data.

Furthermore, the display control unit 18 displays the object data by superimposing the object data on a captured image on the display unit 13, when object data corresponding to the position information and the orientation information of the terminal 10 is acquired.

Furthermore, the display control unit 18 transitions to a mode for continuing to display the object data (display continuation mode) when the determining unit 17 obtains a determination result of continuing to display the object data (when a predetermined condition is satisfied), even when it is no longer detected that an image of a reference object (for example, an AR marker, etc.) is included in a predetermined range (first range) of the captured image. Furthermore, in addition to superimposing and displaying the object data, the display control unit 18 displays a map (for example, a radar map) including a symbol indicating the position of a content with respect to the position of the terminal 10. When an operation satisfying a predetermined condition is received, the display control unit 18 transitions to a mode for continuing to display the object data (display continuation mode), even when the position is no longer included in an area specified according to the position and the orientation of the terminal 10.

Furthermore, when the display control unit 18 transitions to the mode for continuing to display the object data as described above, the display control unit 18 may implement control, such as changing the position, switching to list display, etc. Furthermore, the display control unit 18 displays a recognition frame on the screen such that the area in the predetermined range to be used as the reference is visible, for the user to perform the operation satisfying a predetermined condition to continue the display. Note that the recognition frame may be displayed when the application is activated, or may be displayed when a predetermined condition is satisfied (for example, when an AR marker is recognized). These control operations may be performed by the display control unit 18.

Furthermore, when a predetermined time (or a predetermined number of frames) has passed since transitioning to the mode for continuing to display the object data, or when a predetermined operation by the user is detected, the display control unit 18 cancels the mode for continuing to display described above. The display control unit 18 may manage the operations of switching to the mode described above by using a predetermined flag (fix display flag), and for example, the flag may be set for each object data item; however, the present embodiment is not so limited.

The control unit 19 controls all elements in the terminal 10. For example, the control unit 19 controls a communication process by the communication unit 11, an imaging process (image acquiring process) by the imaging unit 12, a display process by the display unit 13, a recognition process by the recognizing unit 15, a detection process by the detection unit 16, a determination process by the determining unit 17, a display control process by the display control unit 18, etc. Furthermore, the control unit 19 implements control of starting and ending the process, implements control when an error occurs, implements control based on an internal clock, etc.

For example, the terminal 10 is a tablet terminal, a smartphone, a Personal Digital Assistant (PDA), a notebook PC, etc.; however, the terminal 10 is not so limited, for example, the terminal 10 may be a game console and a communication terminal such as a mobile phone. Furthermore, the terminal 10 may be a wearable computer (wearable terminal), etc., such as a HMD, etc. A wearable terminal is a wearable device having a transmission type screen (display unit) at a position corresponding to the user's eyes (within the eyesight). In this case, the terminal 10 is able to display the object data described above within an eyesight range that the user is actually viewing, by displaying the object data, etc., in a transmissive manner on a transmission type screen (display unit). Note that the object data may be displayed as display objects having transmittivity, and may be subjected to display control by the display control unit 18.

Furthermore, in the case of a wearable terminal, among the elements of the terminal 10 described above, the elements relevant to the display unit 13, etc., may be provided in a separate body from the other elements, and a configuration similar to that of the terminal 10 described above may be realized by connecting these elements in the separate body.

<Example of Hardware Configuration of Terminal 10>

Figure 2:
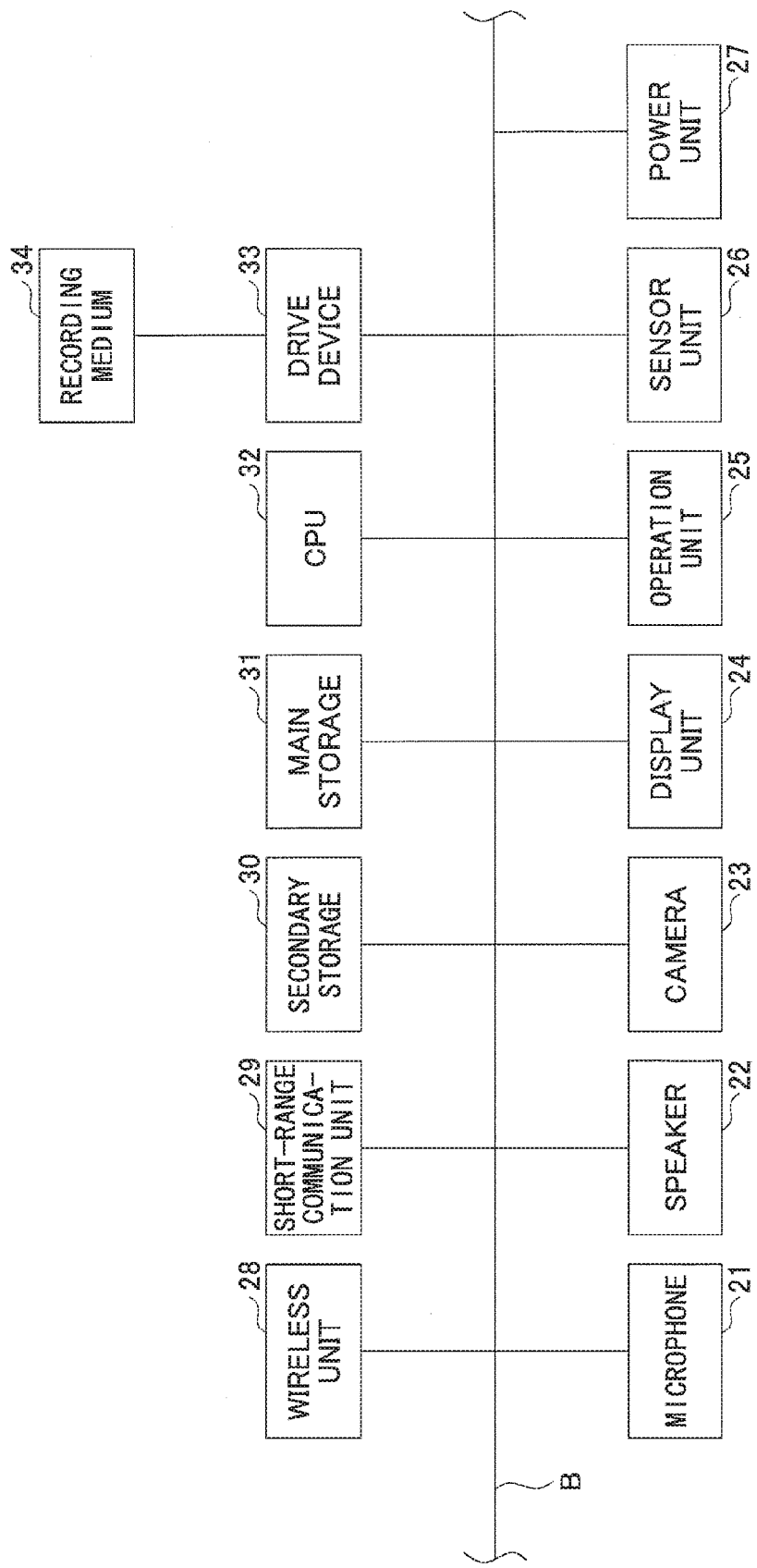
FIG. 2 illustrates an example of a hardware configuration of the terminal.

Next, an example of a hardware configuration of a computer functioning as the terminal 10 is described with reference to a figure. FIG. 2 illustrates an example of a hardware configuration of the terminal 10. In the example of FIG. 2, the terminal 10 includes a microphone 21, a speaker 22, a camera 23, a display unit 24, an operation unit 25, a sensor unit 26, a power unit 27, a wireless unit 28, a short-range communication unit 29, a secondary storage 30, a main storage 31, a Central Processing Unit (CPU) 32, and a drive device 33, which are connected to each other by a system bus B.

The microphone 21 inputs a voice sound emitted by the user and other sounds. The speaker 22 outputs the voice sound of a communication partner or outputs the sound of a ringtone, etc. For example, the microphone 21 and the speaker 22 may be used when speaking with a communication partner by a call function; however, the present embodiment is not so limited, the microphone 31 and the speaker 22 may be used for inputting and outputting information by voice sound.

The camera 23 captures (photographs) an image (a video, a still image) of the real space within the field angle set in advance, for example. The camera 23 is an example of the imaging unit 12 described above. The camera 23 may be built in the terminal 10, or may be provided externally.

The display unit 24 displays, to the user, a screen (for example, an image in which the object data is superimposed on a real space, object data projected on a screen, etc.) set by the Operating System (OS) and various applications. The display unit 24 is an example of the display unit 13 described above.

Furthermore, the display unit 24 may be a touch panel display, etc., in which case the display unit 24 also has a function of an input output unit. The display unit 24 is a display such as a Liquid Crystal Display (LCD), an organic Electro Luminescence (EL) display, etc.

The operation unit 25 includes operation buttons displayed on the screen of the display unit 24 and operation buttons, etc., provided outside the terminal 10. The operation buttons may be, for example, a power button, a sound volume adjustment button, operation keys for inputting characters arranged in a predetermined order, etc. For example, as the user performs a predetermined operation on the screen of the display unit 24 or presses the above-described operation button, a touch position on the screen is detected by the display unit 24. Furthermore, the display unit 24 may display an application execution result, contents, an icon, a cursor, etc., on the screen.

The sensor unit 26 detects the position, the direction, the movements, etc., of the terminal 10 at a certain time point or during a continuous period. The sensor unit 26 is an example of the detection unit 16 described above. For example, the sensor unit 26 detects the orientation, the angle, direction, the position, the acceleration, etc., of the terminal 10; however, the sensor unit 26 is not so limited. Note that the sensor unit 26 is, for example, GPS, a gyro sensor, a tilt sensor, an acceleration sensor, etc.; however, the sensor unit 26 is not so limited.

The power unit 27 supplies power to the elements of the terminal 10. The power unit 27 is, for example, an internal power source such as a battery; however, the power unit 27 is not so limited. The power unit 27 may detect the power level constantly or at predetermined time intervals, and monitor the remaining amount of energy, etc.

The wireless unit 28 is, for example, a transmission reception unit of data that receives wirelessly-transmitted signals (communication data) from a base station (mobile network) by using an antenna, etc., and sending wirelessly-transmitted signals to the base station via the antenna.

The short-range communication unit 29 is able to perform short-range communication with a computer such as another terminal 10, etc., by using a communication method such as infrared communication, Wi-Fi, Bluetooth, etc. The wireless unit 28 and the short-range communication unit 29 described above are communication interfaces that enable the transmission and reception of data with another computer.

The secondary storage 30 is a storage unit such as a Hard Disk Drive (HDD), a Solid State Drive (SSD), etc. The secondary storage 30 stores an execution program (display control program) according to the present embodiment, a control program provided in the computer, etc., and performs input and output according to need, based on control signals from the CPU 32. The secondary storage 30 may read and write information that is needed from various kinds of stored information, based on control signals, etc., from the CPU 32.

The main storage 31 stores execution programs, etc., read from the secondary storage 30 according to an instruction from the CPU 32, and stores various kinds of information, etc., obtained while executing a program. The main storage 31 is, for example, a Read-Only Memory (ROM), a Random Access Memory (RAM), etc.

The CPU 32 implements the processes in display control according to the present embodiment, by controlling the processes of the entire computer such as various calculations, input and output of data with respect to various hardware elements, etc., based on control programs such as the OS, etc., and execution programs stored in the main storage 31. The CPU 32 is an example of the control unit 19 described above.

Specifically, the CPU 32 executes programs installed in the secondary storage 30 based on, for example, an instruction to execute a program, etc., obtained from the operation unit 25, etc., to perform a process corresponding to the program in the main storage 31. For example, the CPU 32 executes the display control program to perform processes such as communication of various kinds of data by the communication unit 11, capturing images by the imaging unit 12, displaying various kinds of information by the display unit 13, displaying various kinds of information by the storage unit 14, detecting position information and orientation information by the detection unit 16, etc., as described above. Furthermore, the CPU 32 executes the display control program to perform processes such as the position recognition by the recognizing unit 15, determination by the determining unit 17, display control by the display control unit 18, etc., as described above. The process contents of the CPU 32 are not limited to the above. The contents executed by the CPU 32 are stored in the secondary storage 30, etc., according to need.

In the drive device 33, for example, a recording medium 34 may be set in a removable manner, and the drive device 33 may read various kinds of information recorded in the set recording medium 34 and write predetermined information in the recording medium 34. The drive device 33 is, for example, a medium loading slot, etc.; however, the drive device 33 is not so limited.

The recording medium 34 is a computer-readable recording medium that stores execution programs, etc., described above. The recording medium 34 may be, for example, a semiconductor memory such as a flash memory, etc. Furthermore, the recording medium 34 may be a portable recording medium such as a Universal Serial Bus (USB), etc.; however, the recording medium 34 is not so limited.

In the present embodiment, by installing an execution program (for example, a display control program, etc.) in the hardware configuration of the computer main unit described above, the hardware resources and the software cooperate with each other to implement the display control process, etc., according to the present embodiment. Furthermore, for example, the display control program corresponding to the display control process described above may be resident in the terminal 10, and may be activated according to an activation instruction.

<Example of Data>

Figure 4:
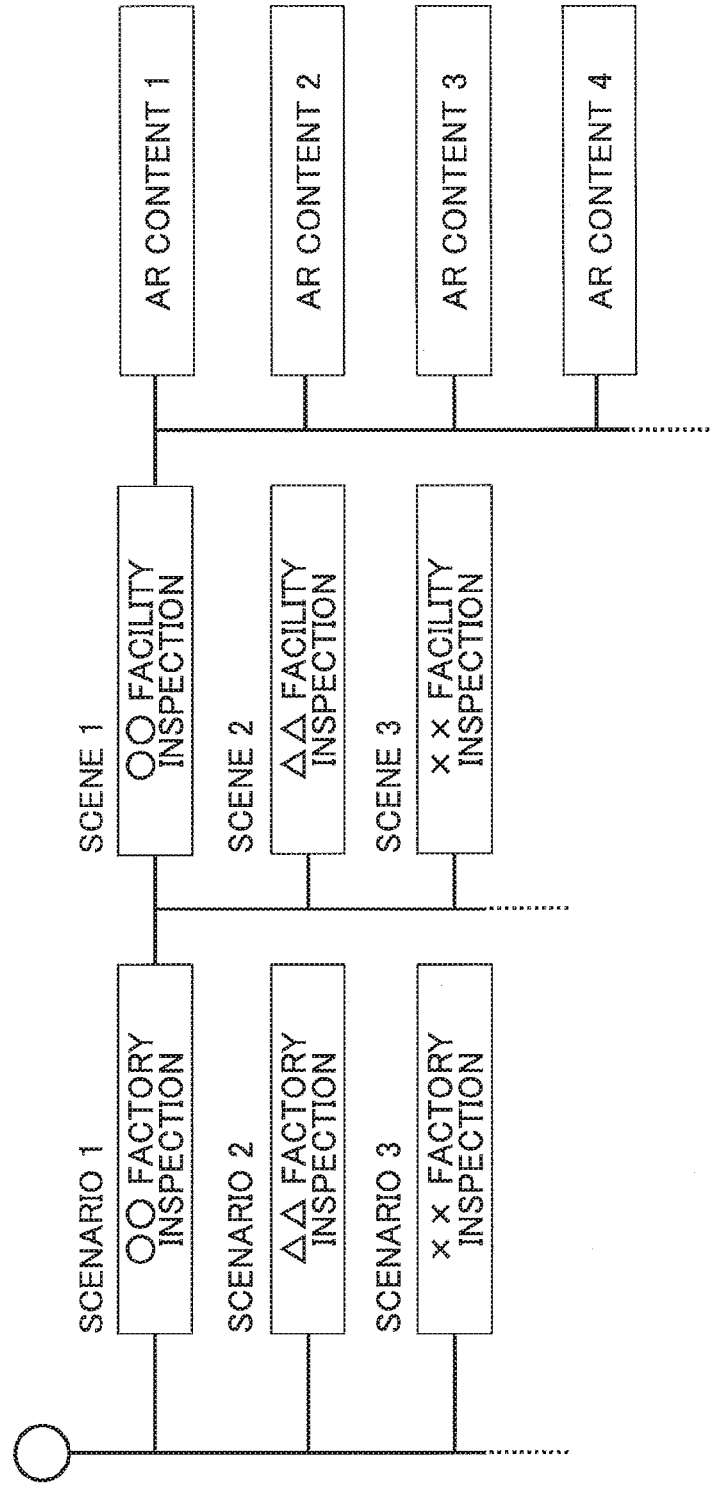
FIG. 4 illustrates an example of a data configuration of various kinds of data.

Next, examples of data used in the display process according to the present embodiment are described with reference to figures. FIGS. 3A through 3D illustrate examples of various kinds of data applied in the present embodiment. Furthermore, FIG. 4 illustrates an example of a data configuration of various kinds of data. FIG. 3A illustrates an example of a scenario management table, FIG. 3B illustrates an example of a scene management table, FIG. 3C illustrates an example of an AR content management table, and FIG. 3D illustrates an example of a recognition frame management table. The information items illustrated in FIGS. 3A through 4C are examples of the AR content information described above; however, the data format and structure are not so limited, as long as the object data and the corresponding position information are associated in the information.

For example, in the present embodiment, the object data may be set in association with the respective coordinate values (position information), to be indicated on a world coordinate system corresponding to position information (latitude, longitude, altitude) acquired from GPS. However, when multiple object data items are set with respect to a particular position or orientation of the terminal 10, it will not be possible to display all of the object data items. Furthermore, for example, in a case of inspection operations, etc., at a factory, etc., when precautions, operation contents, etc., are set in advance with the use of object data, the person in charge of the inspection is to acquire the information with respect to the target (scenario or scene) that the person is in charge of.

Therefore, in the present embodiment, the AR content information is separately set in hierarchies as illustrated in FIG. 4, based on the scenario and the scene such as the location, the environment, etc. Accordingly, when the user wants to refer to the AR content information, by selecting or setting in advance the scenario and scene, it is possible to display only the AR content information of the corresponding scenario and scene on the screen. For example, it is possible to limit the range of displaying the object data to the inside of a particular factory, a particular premise, a particular building, etc.

Examples of items in the example of the scenario management table of FIG. 3A are "scenario ID", "scenario name", etc.; however, the items are not so limited. "Scenario ID" is for setting the scenario of the target to which the AR content is to be provided. "Scenario name" is the name of the scenario corresponding to the scenario ID, and may be distinguished by, for example, a plan name, an operation name, the present contents, etc.; however, the scenario names are not so limited.

Examples of items in the example of the scene management table of FIG. 3B are "parent scenario ID", "scene ID", "scene name", "recognition frame ID", etc.; however, the items are not so limited. "Parent scenario ID" indicates the identification information of a scenario, and is associated with the item "scenario ID" in the scenario management table of FIG. 3A.

"Scene ID" is information for identifying a scene corresponding to the parent scenario, and is also information for segmenting the "scenario ID" into predetermined scenes. Furthermore, the "scene name" is information of the location, an event, operation contents, etc., corresponding to the scene ID; however, the scene names are not so limited. Furthermore, "recognition frame ID" is used as a condition for transitioning to the mode of continuing to display the object data displayed in the image, for example, even when the terminal 10 has moved or when an AR marker is no longer recognized in the captured image.

Examples of items in the example of the AR content management table of FIG. 3C are "parent scenario ID", "parent scene ID", "marker ID", "AR content ID", "coordinate values", "rotation angle", "magnification/reduction ratio", "texture path", etc.; however, the items are not so limited.

"Parent scenario ID" is associated with the scenario ID indicated in FIG. 3A. "Parent scene ID" is obtained by segmenting the parent scenario ID into predetermined scenes, and is associated with the scene ID in FIG. 3B. "Marker ID" is information for identifying the type of AR marker recognized by the recognizing unit 15. For example, when there is no "marker ID" (for example, when the space is blank), the AR content information is acquired in association with position information that may be obtained from GPS, etc.

"AR content ID" is information for identifying one or more object data items (AR contents) corresponding to the respective parent scene IDs. "Coordinate values" is information relevant to a three-dimensional position (Xc1, Yc1, Zc1) at which the object data is displayed. "Coordinate values" are set based on, for example, the position information, the orientation information, etc., of the terminal 10.

"Rotation angle" is information (Xr1, Yr1, Zr1) indicating the amount of tilt in the three-dimensional direction from a basic angle set in advance with respect to corresponding object data. "Magnification/reduction ratio" is information (Xs1, Ys1, Zs1) indicating the extent of magnification or reduction in the three-dimensional axis directions, by using a predetermined size of the corresponding object data set in advance as a reference. In the present embodiment, at least one of the above-described "coordinate values", "rotation angle", and "magnification/reduction ratio" may be used as the position information of the object data.

"Texture path" is storage destination information of object data corresponding to the AR content ID. For example, the "texture path" may be address information such as "http://xxx.png" of a management server, a device other than a management server, etc., or the storage destination of a folder, etc.; however, the "texture path" is not so limited. Furthermore, in the "texture path", information (file name) such as image data, video data, text data, etc., corresponding to the object data, may be directly stored. In the example of FIG. 3C, the AR content information (object data and position information) is set in association with the scenario, the scene, etc.

In the present embodiment, each example of data illustrated in FIGS. 3A through 3C has a data configuration formed of hierarchies as illustrated in FIG. 4. In the example of FIG. 4, with respect to "◯◯ factory inspection" of scenario ID "1", scenes of "◯◯ facility inspection" (scene 1), "ΔΔ facility inspection" (scene 2), and "xx facility inspection" (scene 3) are set as segments of the scenario. These scenes may be expressed in hierarchies, and furthermore, AR contents 1 through 4 are set in each scene. That is, in each scene, a plurality of AR content information items may be set. In the example of FIG. 4, the data is managed by an image of a tree structure; however, the structure, etc., by which the data is managed is not so limited.

Examples of items in the example of the guide management table of FIG. 3D are "recognition frame ID", "recognition frame coordinates", etc.; however, the items are not so limited. "Recognition frame ID" is information for identifying the type of recognition frame, and is associated with the "recognition frame ID" in the scene management table of FIG. 3B. "Recognition frame coordinates" indicates the shape, the size, etc., of the recognition frame corresponding to the "recognition frame ID". In the example of FIG. 3D, the respective coordinate values (x, y) of the four corners of the recognition frame (X1, X2, X3, X4) are set, by using a corner of the screen of the display unit 13 as a reference (0, 0); however, the recognition frame coordinates are not so limited. For example, in the case of a circular recognition frame, information indicating the center and the radius may be used. Furthermore, the recognition frame may be set in a three-dimensional manner, such as a cube, a sphere, etc.

Note that the various kinds of data described above are information that is set at the terminal 10, or acquired from a management server, etc., via the above-described communication network, and stored in the storage unit 14, etc. The above information may be, for example, acquired from a management server, etc., when the display control process according to the present embodiment is executed; however, the display control process is not so limited. The terminal 10 may change and update the AR content information set in advance, and the contents of the data may also be changed and updated accordingly. Furthermore, the above information may be set in association with user information acquired from the terminal 10. Furthermore, the information stored in the storage unit 14 is not limited to the examples of data described above; user information, process history information, various kinds of setting information, etc., may be stored.

<Example of Display Control Process>

Next, an example of a display control process according to the present embodiment is described with reference to a flowchart.

<First Embodiment>

Figure 5:
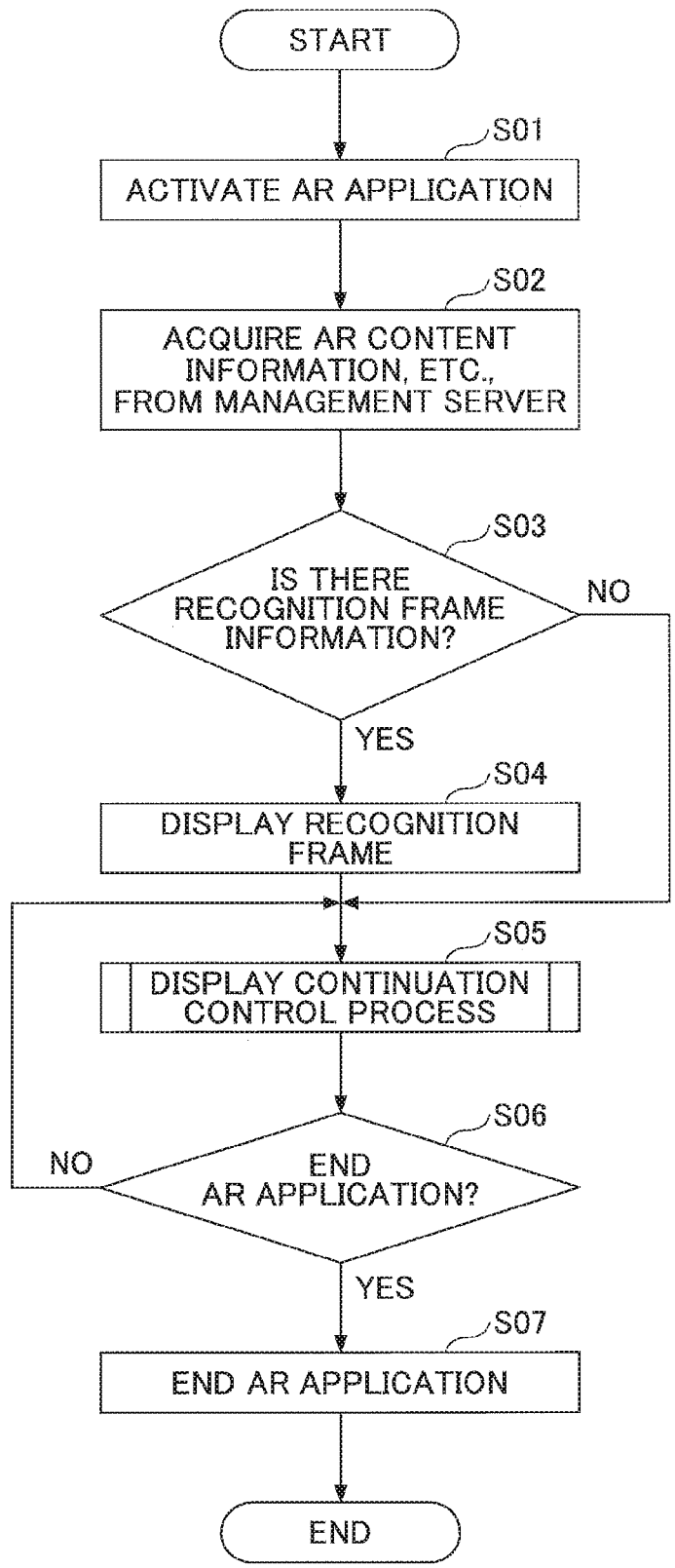
FIG. 5 is a flowchart of an example of a display control process according to a first embodiment.

FIG. 5 is a flowchart of an example of a display control process according to the first embodiment. In the first embodiment, a case where a recognition frame is constantly displayed on the screen of the terminal 10 is described. In the example of FIG. 5, the control unit 19 of the terminal 10 activates an AR application for performing the display control process according to the first embodiment (step S01), and acquires AR content information, etc., such as that illustrated in FIGS. 3A through 3D (including a recognition frame management table, etc., described above), from a management server, etc. (step S02).

Note that in the process of step S01, by activating the AR application, for example, imaging by the imaging unit 12 may be started and a captured image may be acquired, or a captured image may be acquired from a device other than the imaging unit 12 and the acquired image may be displayed on a screen. Furthermore, when the terminal 10 is a HMD, etc., not only the captured image, but the real space ahead of the captured image will be visible via a transmission type screen (display unit). Furthermore, in the process of step S02, for example, when the AR content information, etc., is stored in the storage unit 14 in advance, the AR content information may be acquired from the storage unit 14. Furthermore, in the process of step S02, for example, the user may select, from the scenarios and scenes described above, a scenario and a scene corresponding to the AR content information (object data) that the user desires to display, and acquire the AR content information corresponding to the selected scenario and scene.

Next, the display control unit 18 determines whether there is recognition frame information (for example, a recognition frame management table, etc.) (step S03), and if there is recognition frame information (YES in step S03), the corresponding recognition frame is displayed (step S04). In the process of step S04, a recognition frame associated with a scenario or a scene may be displayed, or a recognition frame set by the user in advance may be displayed.

Furthermore, after the process of step S04, or in the process of step S03, if there is no recognition frame (NO in step S03), the display control unit 18 performs a display continuation control process (step S05). A specific example of step S05 is described below. Next, the control unit 19 determines whether to end the AR application (step S06), and if the AR application is not to be ended (NO in step S06), the process returns to step S05. Furthermore, if the AR application is to be ended (YES in step S06), the AR application is ended (step S07), and the process ends.

<Step S05; Display Continuation Control Process (First Example)>

Figure 6:
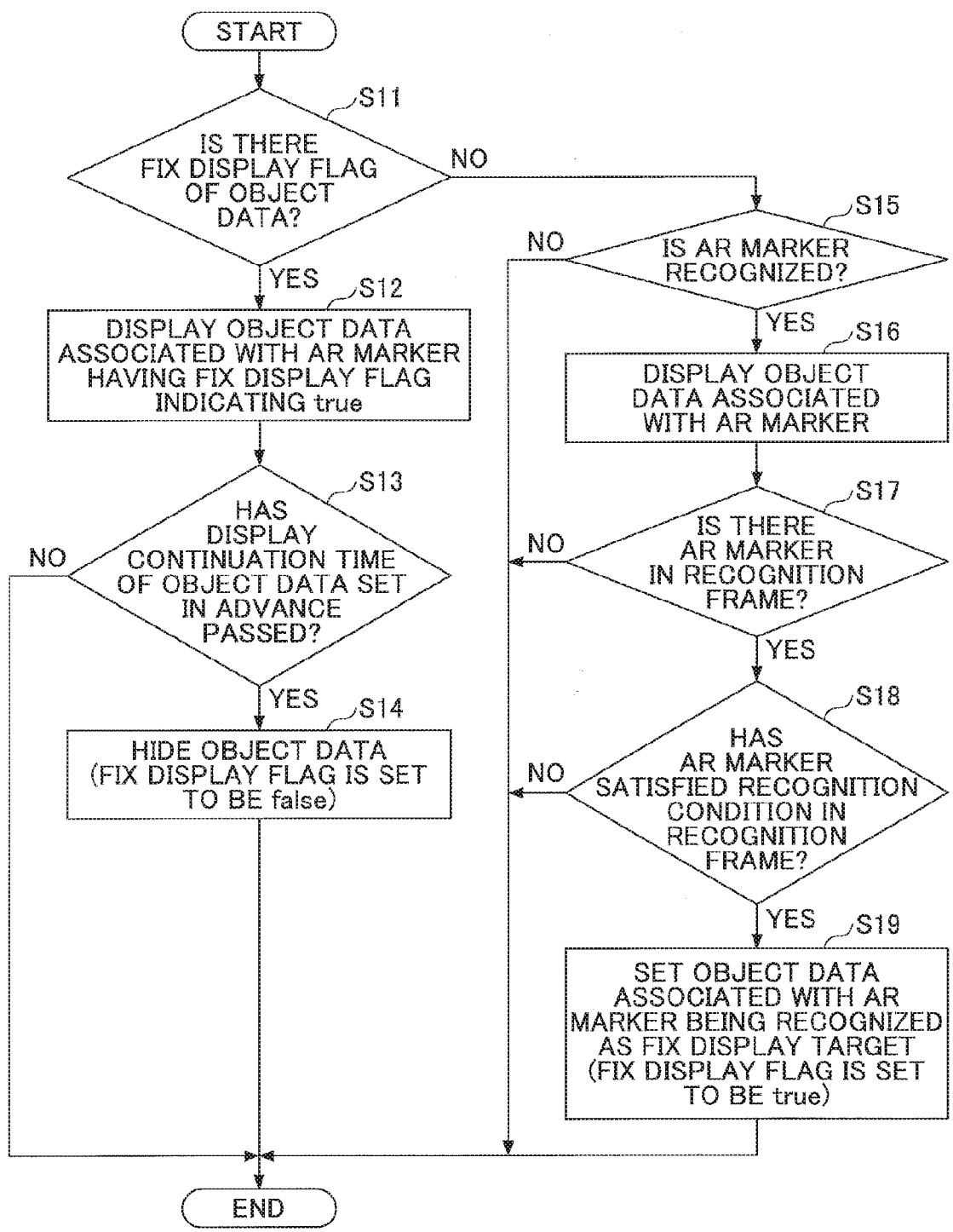
FIG. 6 is a flowchart of a first example of a display continuation control process according to the first embodiment.

A first example of the display continuation control process according to the first embodiment described is described with reference to a flowchart. FIG. 6 is a flowchart of a first example of the display continuation control process according to the first embodiment. In the first example, an AR marker that is an example of a reference object is recognized in a predetermined range (second range) on the screen, and at a timing when the AR marker is continuously recognized for a predetermined time, the display state of the object data corresponding to the AR marker is fixed. Accordingly, even when the AR marker is no longer recognized on the screen, it is possible to continue displaying the object data corresponding to the AR marker.

Note that in the following description, a fix display flag is used as a reference for determining whether the present mode is a mode for continuing to display the object data; however, the present embodiment is not so limited. The fix display flag may be set, for example, for each object data item. For example, when the fix display flag is true, the display is continued (display continuation mode), and when the fix display flag is false, the display is not continued (cancel display continuation mode), and the object data is hidden at the time point when an AR marker is no longer recognized on the screen. Furthermore, the initial value of the fix display flag is set as false. The fix display flag may be set for each AR marker and each object data item.

In the example of FIG. 6, the display control unit 18 determines whether there is a fix display flag for the object data (step S11), and if there is a fix display flag for the displayed object data (YES in step S11), the display control unit 18 displays the object data that is associated with the AR marker having a fix display flag indicating true, among the AR markers on the screen (step S12).

Next, the display control unit 18 determines whether the display continuation time of the object data set in advance (for example, 10 seconds, one minute, five minutes, etc.) has passed (step S13), and if the display continuation time has passed (YES in step S13), the display control unit 18 hides the object data (the fix display flag is set to be false) (step S14). Note that in the process of step S14, when the AR marker is recognized in a predetermined range (first range)

of the captured image displayed on the screen, the object data corresponding to the recognized AR marker may be continuously displayed.

Furthermore, in step S11, if there is no fix display flag for the object data (NO in step S11), the display control unit 18 determines whether it is recognized (detected) that an image of the AR marker is included in a predetermined range (first range) of the captured image on the screen (step S15), and if this is recognized (YES in step S15), the display control unit 18 displays the object data associated with the AR marker (step S16). Next, the display control unit 18 determines whether an AR marker is present in the recognition frame (second range) displayed in the process of step S04 (step S17), and if the AR marker is present (YES in step S17), the display control unit 18 determines whether the AR marker satisfies a recognition condition in the recognition frame (step S18).

Note that a recognition condition is, for example, at least part of the image of the AR marker is present in the recognition frame for longer than a predetermined time, etc.; however, the present embodiment is not so limited. For example, a predetermined operation may be the condition, such as the user touches the AR marker included in the recognition frame, on the screen, etc. Furthermore, in the processes of steps S17 and S18 described above, for example, it may be determined whether a recognition condition is satisfied in the recognition frame, by using the displayed object data as the target, instead of the AR marker. For example, each recognition condition may be acquired by the management server, etc., or may be set by the terminal 10.

In the process of step S18, if the recognition condition is satisfied (YES in step S18), the display control unit 18 sets the object data associated with the AR marker being recognized, as a fix display target (the fix display flag is set to be true) (step S19). Furthermore, in the process of step S13, if the display continuation time has not passed (NO in step S13), after the process of step S14, in the process of step S15, if the AR marker is not recognized (NO in step S15), in the process of step S17, if the AR marker is not present in the recognition frame (NO in step S17), in the process of step S18, if the recognition condition is not satisfied (NO in step S18), or after the process of step S19, the display control unit 18 ends the process.

Note that in the first example described above, the object data associated with the AR marker being recognized is set as the fix display target (the fix display flag is set to be true) when the recognition condition is satisfied in the process of step S18; however, the present embodiment is not so limited. For example, the display control unit 18 may hide the object data associated with the above AR marker being recognized, and may set the object data associated with another AR marker recognized on the screen other than the above AR marker, as the fix display target (the fix display flag is set to be true). In the first example, when the recognition condition is satisfied in the recognition frame, the object data associated with the AR marker satisfying the condition may be set as the fix display target, or this object data may be hidden, and other object data displayed on the screen may be set as the fix display target. These display control methods may be set in advance by the user, etc.

<Step S05; Display Continuation Control Process (Second Example)>

Figure 7:
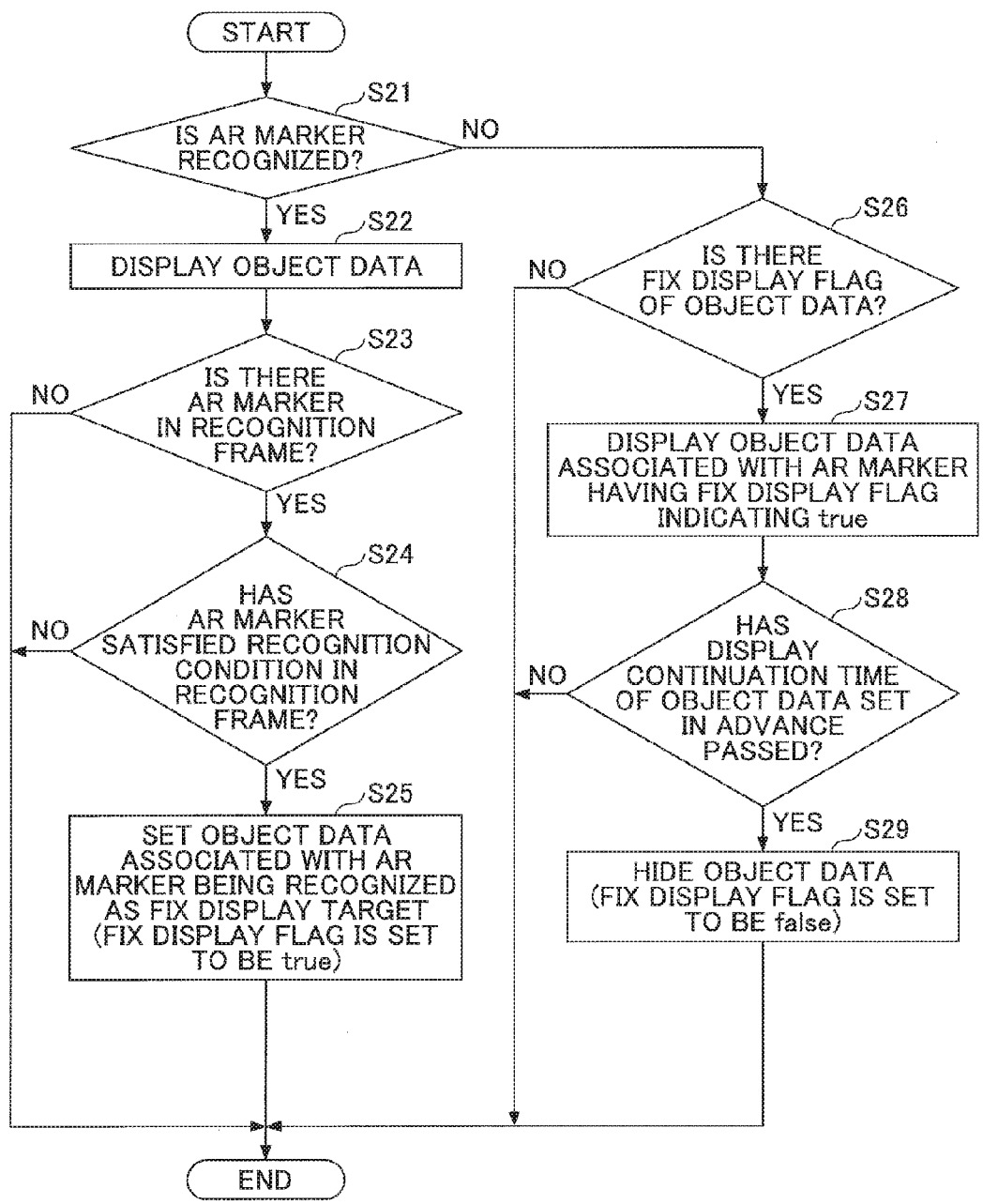
FIG. 7 is a flowchart of a second example of a display continuation control process according to the first embodiment.

A second example of the display continuation control process according to the first embodiment is described with reference to a flowchart. FIG. 7 is a flowchart of a second example of the display continuation control process according to the first embodiment. In the second example, when an AR marker is recognized and the AR marker is continuously recognized for a predetermined time, the fix display flag is set to be true (display continuation mode). At a timing when the AR marker, for which the fix display flag has been set to be true, turns in to an unrecognized state (not recognized any longer in the captured image), the object data associated with the AR marker is displayed for a predetermined time (for example, 10 seconds, one minute, five minutes, etc.). Furthermore, in the second example, at a timing when the AR marker is recognized again in the recognition frame displayed in the process of step S04, the fixed display of the AR content is cleared (display continuation mode is canceled).

In the example of FIG. 7, the display control unit 18 determines whether it is recognized that an image of an AR marker is included in a predetermined range (first range) of the captured image on the screen (step S21), and if this is recognized (YES in step S21), the display control unit 18 displays the object data associated with the AR marker (step S22).

Next, the display control unit 18 determines whether an AR marker is present in the recognition frame (second range) displayed in the process of step S04 (step S23), and if the AR marker is present (YES in step S23), the display control unit 18 determines whether the AR marker satisfies a recognition condition in the recognition frame (step S24). In the process of step S24, the determination may be made by using the same recognition condition as that of the process of step S18 described above. If the recognition condition is satisfied in the recognition frame (YES in step S24), the display control unit 18 sets the object data associated with the AR marker being recognized, as a fix display target (the fix display flag is set to be true) (step S25).

Furthermore, if the AR marker is not recognized in the process of step S21 (NO in step S21), the display control unit 18 determines whether there is a fix display flag for the object data (step S26). If there is a fix display flag for the object data (YES in step S26), the display control unit 18 displays the object data that is associated with the AR marker having a fix display flag indicating true, among the AR markers on the screen (step S27).

Next, the display control unit 18 determines whether the display continuation time of the object data set in advance has passed (step S28), and if the display continuation time has passed (YES in step S28), the display control unit 18 hides the object data (the fix display flag is set to be false) (step S29). Note that in the process of step S29, when the AR marker is recognized on the screen, the object data corresponding to the AR marker may be continuously displayed.

Furthermore, in the process of step S23, if the AR marker is not present in the recognition frame (NO in step S23), in the process of step S24, if the recognition condition is not satisfied (NO in step S24), after the process of step S25, in the process of step S26, if there is no fix display flag (NO in step S26), in the process of step S28, if the display continuation time has not passed (NO in step S28), or after the process of step S29, the display control unit 18 ends the process.

Note that in the second example described above, similar to the first example, when the recognition condition is satisfied in the recognition frame, the object data associated with the AR marker satisfying the condition may be set as the fix display target, or this object data may be hidden, and other object data displayed on the screen may be set as the fix display target.

<Second Embodiment>

Figure 8:
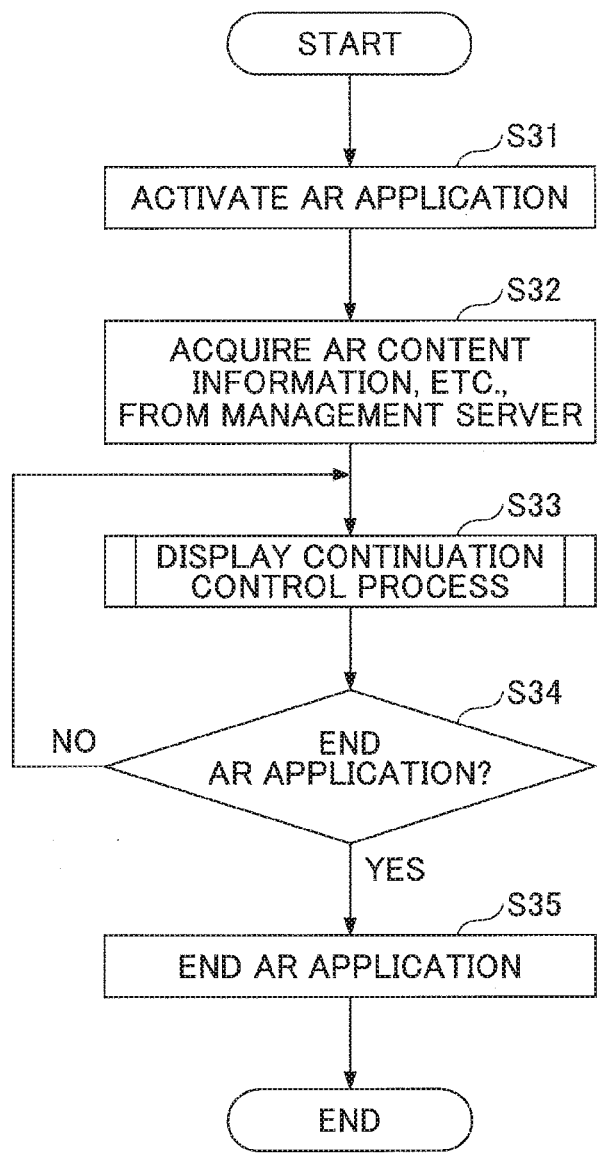
FIG. 8 is a flowchart of an example of a display control process according to a second embodiment.

FIG. 8 is a flowchart of an example of a display control process according to the second embodiment. In the second embodiment, a case where a recognition frame is displayed when a condition set in advance is satisfied. In the example of FIG. 8, the control unit 19 of the terminal 10 activates an AR application for performing the display control process according to the present embodiment (step S31), and acquires AR content information, etc., such as that illustrated in FIGS. 3A through 3D (including the recognition frame management table, etc., described above), from a management server, etc. (step S32).

Note that in the process of step S31, by activating the AR application, for example, imaging by the imaging unit 12 may be started and a captured image may be acquired, or a captured image may be acquired from a device other than the imaging unit 12 and the acquired image may be displayed on a screen. Furthermore, when the terminal 10 is a HMD, etc., not only the captured image, but the real space ahead of the captured image will be visible by a transmission type screen (display unit). Furthermore, in the process of step S32, for example, when the AR content information, etc., is stored in the storage unit 14 in advance, the AR content information may be acquired from the storage unit 14. Furthermore, in the process of step S32, for example, the user may select, from the scenarios and scenes described above, a scenario and a scene corresponding to the AR content information (object data) that the user desires to display, and acquire the AR content information corresponding to the selected scenario and scene.

Next, the display control unit 18 performs a display continuation control process (step S33). A specific example of the display continuation control process of step S33 is described below. Next, the control unit 19 determines whether to end the AR application (step S34), and if the AR application is not to be ended (NO in step S34), the process returns to step S33. Furthermore, if the AR application is to be ended (YES in step S34), the AR application is ended (step S35), and the process ends.

<Step S33; Display Continuation Control Process (First Example)>

Figure 9:
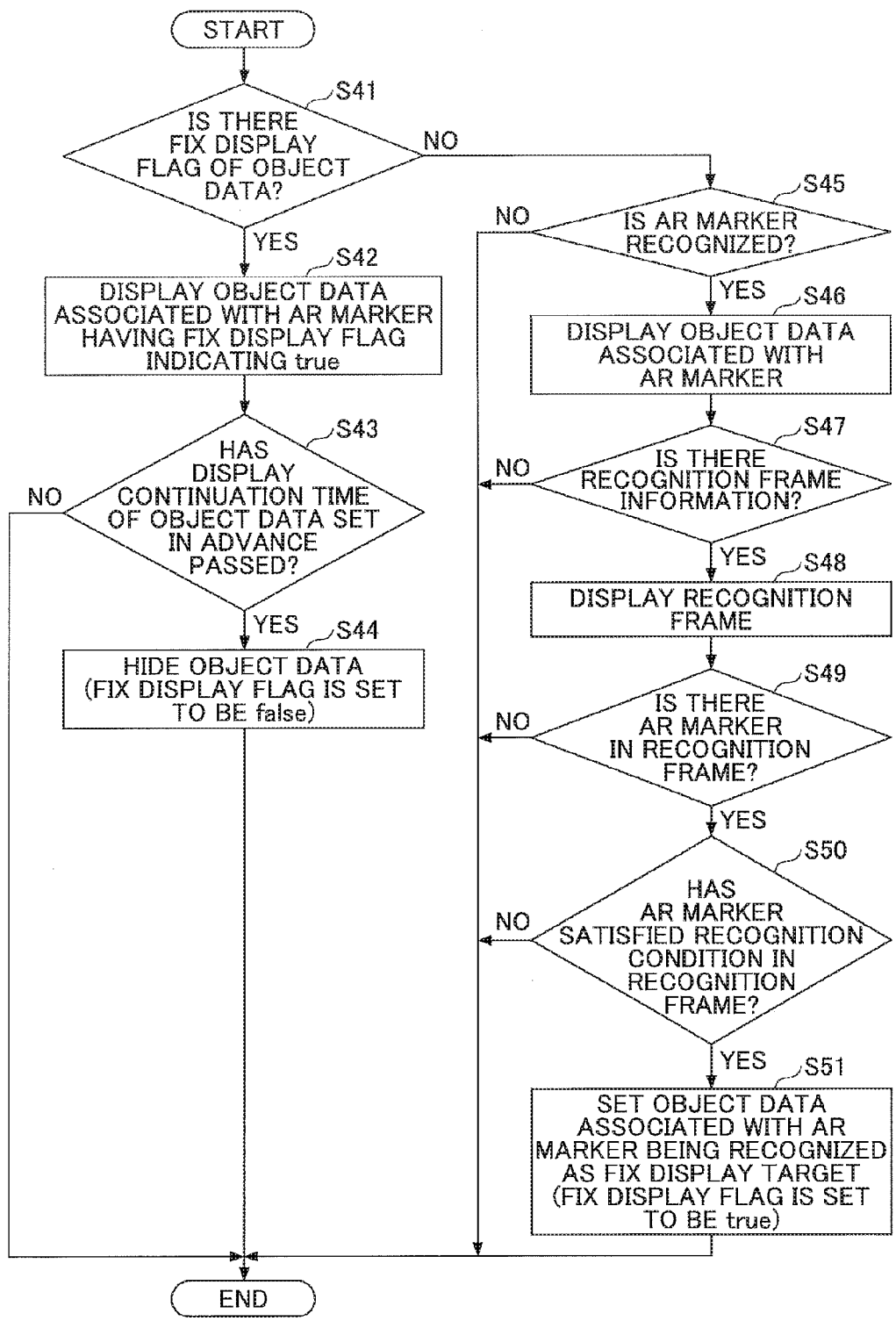
FIG. 9 is a flowchart of a first example of a display continuation control process according to the second embodiment.

A first example of the display continuation control process according to the second embodiment is described with reference to a flowchart. FIG. 9 is a flowchart of a first example the display continuation control process according to the second embodiment. In the first example, an AR marker is recognized, and at a timing when the AR marker is continuously recognized for a predetermined time, the display state of the object data is fixed.

In the example of FIG. 9, the display control unit 18 determines whether there is a fix display flag for the object data (step S41), and if there is a fix display flag for the object data (YES in step S41), the display control unit 18 displays the object data that is associated with the AR marker having a fix display flag indicating true, among the AR markers on the screen (step S42).

Next, the display control unit 18 determines whether the display continuation time of the object data set in advance (for example, 10 seconds, one minute, five minutes, etc.) has passed (step S43), and if the display continuation time has passed (YES in step S43), the display control unit 18 hides the object data (the fix display flag is set to be false) (step S44).

Furthermore, in step S41, if there is no fix display flag for the object data (NO in step S44), the display control unit 18 determines whether it is recognized that an image of the AR marker is included in a predetermined range (first range) of the captured image (step S45), and if this is recognized (YES in step S45), the display control unit 18 displays the object data associated with the AR marker (step S46).

Next, the display control unit 18 determines whether there is recognition frame information (step S47), and if there is recognition frame information (YES in step S47), the display control unit 18 displays the corresponding recognition frame (step S48). The process of step S48, similar to the first embodiment, a recognition frame associated with a scenario or a scene may be displayed, or a recognition frame set by the user in advance may be displayed; however, the present embodiment is not so limited.

Next, the display control unit 18 determines whether an AR marker is present in the recognition frame (second range) (step S49), and if the AR marker is present (YES in step S49), the display control unit 18 determines whether the AR marker satisfies a recognition condition in the recognition frame (step S50). Note that, similar to the first embodiment, a recognition condition is, for example, at least part of the image of the AR marker is present in the recognition frame for longer than a predetermined time, a predetermined operation is performed, such as the user touches the AR marker included in the recognition frame, on the screen, etc.; however, the present embodiment is not so limited. For example, each recognition condition may be acquired by the management server, etc., or may be set by the terminal 10.

In the process of step S50, if the recognition condition is satisfied (YES in step S50), the display control unit 18 sets the object data associated with the AR marker being recognized, as a fix display target (the fix display flag is set to be true) (step S51). Furthermore, in the process of step S43, if the display continuation time has not passed (NO in step S43), after the process of step S44, in the process of step S45, if the AR marker is not recognized (NO in step S45), in the process of step S47, if there is no recognition frame information (NO in step S47), in the process of step S49, if the AR marker is not present in the recognition frame (NO in step S49), in the process of step S50, if the recognition condition is not satisfied (NO in step S50), or after the process of step S51, the display control unit 18 ends the process.

Note that in the first example described above, similar to the first embodiment, when the recognition condition is satisfied in the recognition frame, the object data associated with the AR marker satisfying the condition may be set as the fix display target, or this object data may be hidden, and other object data displayed on the screen may be set as the fix display target.

<Step S33; Display Continuation Control Process (Second Example)>

Figure 10:
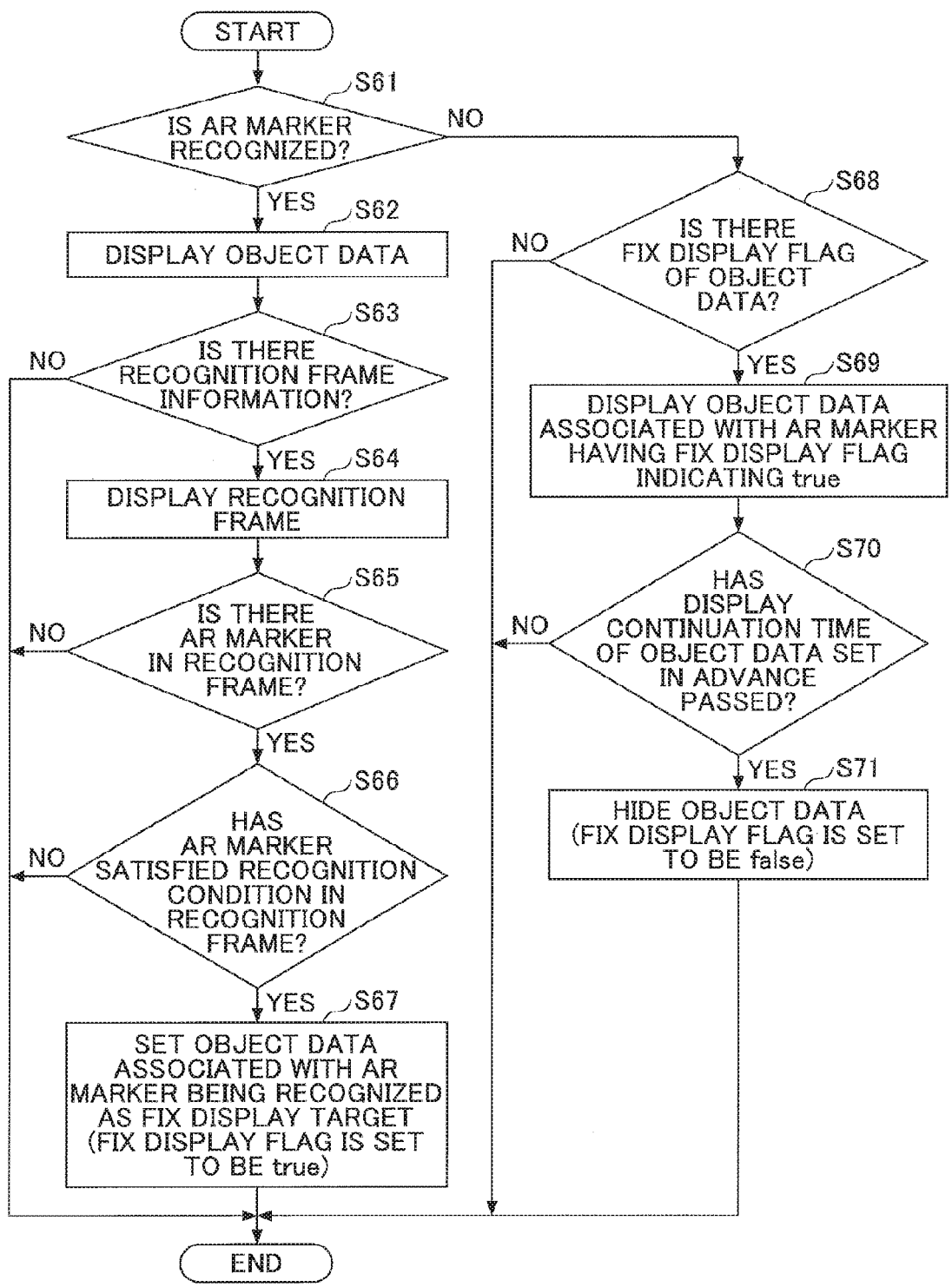
FIG. 10 is a flowchart of a second example of a display continuation control process according to the second embodiment.

A second example of the display continuation control process according to the second embodiment is described with reference to a flowchart. FIG. 10 is a flowchart of a second example of the display continuation control process according to the second embodiment. In the second example, when an AR marker is recognized and the AR marker is continuously recognized for a predetermined time, the fix display flag is set to be true (display continuation mode). At a timing when the AR marker, for which the fix display flag has been set to be true, turns in to an unrecognized state, the object data associated with the AR marker is displayed for a predetermined time. Furthermore, in the second example, at a timing when the AR marker is recognized again in the recognition frame displayed in the process of step S04, the fixed display of the AR content is cleared (display continuation mode is canceled).

In the example of FIG. 10, the display control unit 18 determines whether it is recognized that an image of an AR marker is included in a predetermined range (first range) of the captured image on the screen (step S61), and if this is recognized (YES in step S61), the display control unit 18 displays the object data associated with the AR marker (step S62).

Next, the display control unit 18 determines whether there is recognition frame information (step S63), and if there is recognition frame information (YES in step S63), the display control unit 18 displays the corresponding recognition frame (step S64). Next, the display control unit 18 determines whether an AR marker is present in the recognition frame (second range) (step S65), and if the AR marker is present (YES in step S65), the display control unit 18 determines whether the AR marker satisfies a recognition condition in the recognition frame (step S66). In the process of step S66, the determination may be made by using the same recognition condition as that of the first example described above; however, the present example is not so limited. If the recognition condition is satisfied in the recognition frame (YES in step S66), the display control unit 18 sets the object data associated with the AR marker being recognized, as a fix display target (the fix display flag is set to be true) (step S67).

Furthermore, if the AR marker is not recognized in the process of step S61 (NO in step S61), the display control unit 18 determines whether there is a fix display flag for the object data (step S68). If there is a fix display flag for the object data (YES in step S68), the display control unit 18 displays the object data that is associated with the AR marker having a fix display flag indicating true, among the AR markers on the screen (step S69).

Next, the display control unit 18 determines whether the display continuation time of the object data set in advance has passed (step S70), and if the display continuation time has passed (YES in step S70), the display control unit 18 hides the object data (the fix display flag is set to be false) (step S71).

Furthermore, in the process of step S63, if there is no recognition frame information (NO in step S63), in the process of step S65, if the AR marker is not present in the recognition frame (NO in step S65), in the process of step S66, if the recognition condition is not satisfied (NO in step S66), after the process of step S67, in the process of step S68, if there is no fix display flag (NO in step S68), in the process of step S70, if the display continuation time has not passed (NO in step S70), or after the process of step S71, the display control unit 18 ends the process.

Note that in the second example described above, similar to the first embodiment, when the recognition condition is satisfied in the recognition frame, the object data associated with the AR marker satisfying the condition may be set as the fix display target, or this object data may be hidden, and other object data displayed on the screen may be set as the fix display target.

Note that in the display control process according to the first and second embodiments described above, part of or all of the elements may be combined according to need. Furthermore, in the display control processes illustrated in FIGS. 5 through 10 described above, an AR marker is used as one example; however, the present embodiment is not so limited. For example, it is also possible to switch (transition) the display continuation mode of the object data by using a fix display flag, etc., similarly in a case where the object data is displayed on a screen based on the position information and the orientation information of the terminal 10 or the imaging unit 12 obtained from GPS, etc. In this case, for example, the terminal 10 does not determine the recognition of an AR marker, instead, the terminal 10 acquires object data corresponding to the position information and the orientation information of the terminal 10, and compares the positions of the acquired object data and the recognition frame, to switch the display continuation mode.

<Examples of Screens>

Next, examples of screens of the display control process according to the present embodiment (first and second embodiments) are described with reference to figures. FIGS. 11A through 14C illustrate examples of screens of the display control process according to the present embodiment (parts 1 through 4).

Figure 11B:
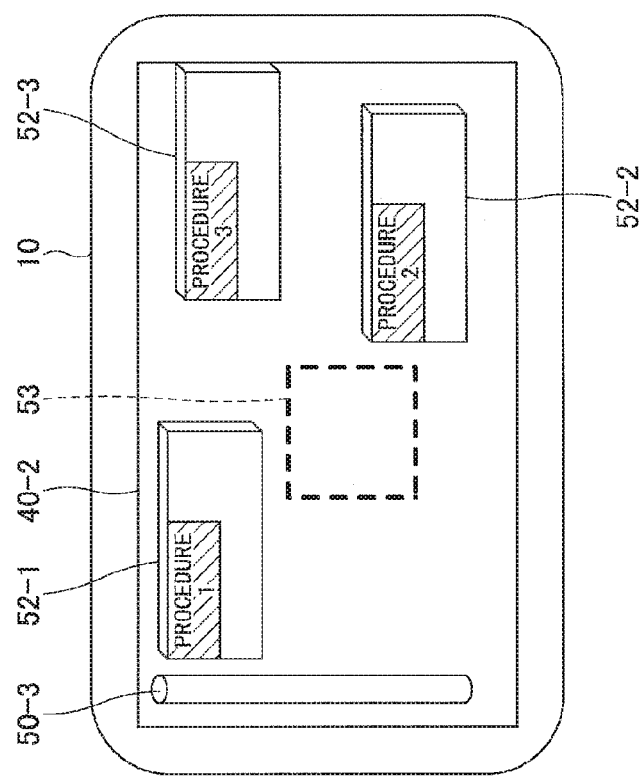
FIGS. 11A and 11B illustrate an example of a screen of the display control process according to an embodiment (part 1)
Figure 11A:
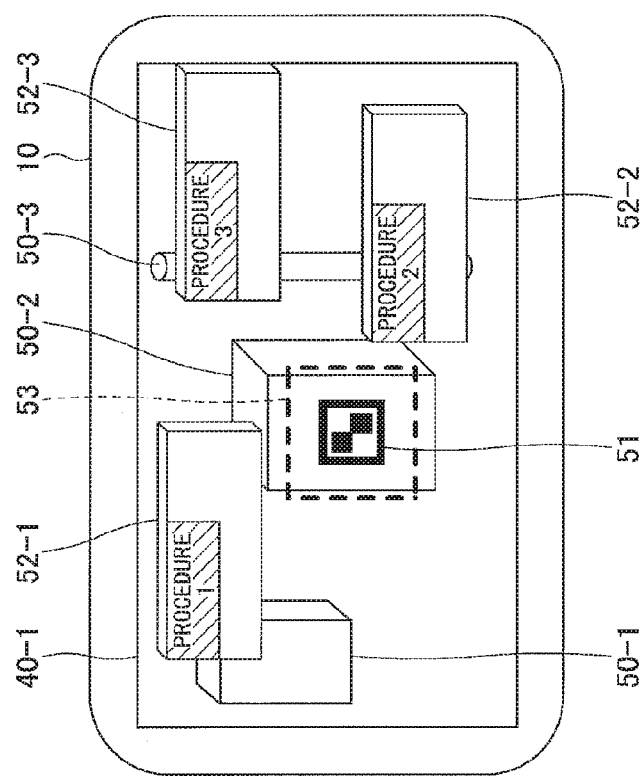

In the example of FIG. 11A, on a screen 40-1 of the terminal 10, real objects 50-1 through 50-3 such as walls, a pipe, a PC, a server, an inspection target device, an operation panel, a valve, etc., are displayed in a captured image. Furthermore, on the real object 50-2, an AR marker 51 is attached, as an example of a reference object. For example, the terminal 10 recognizes the AR marker 51 (for example, a real object or a GPS position as the reference may also be used) included on the screen 40-1 (in the first range), and the terminal 10 displays, as a recognition result, object data 52-1 through 52-3 at relative positions by using the display position (center) of the AR marker 51 as a reference. The position information may be acquired from AR content information, etc., described above.

In the example of FIGS. 11A and 11B, a recognition frame 53 (second range) is displayed at a position set in advance, in order to continue displaying the object data 52. Note that the recognition frame 53 is a predetermined range that may be part of the range on the screen 40-1 as illustrated in FIG. 11A, or may be the same range (size) as the screen 40-1.

At this time, as illustrated in FIG. 11A, the reference object such as the AR marker 51, etc., is displayed such that at least part of the AR marker 51 is included in the recognition frame 53 (in the second range). Accordingly, as illustrated on the screen 40-2 of FIG. 11B, when the AR marker is outside a range that a predetermined user is able to recognize with a camera at a predetermined position, if a particular condition is satisfied, it is possible to continuously display the object data 52 associated with the AR marker 51 recognized in the recognition frame.

That is, on the example of FIGS. 11A and 11B, the recognition frame 53 of the AR marker is provided near the center of the screen. With respect to an AR marker 51 that satisfies a particular condition in this recognition frame 53, subsequently, even when the AR marker 51 is no longer recognized on the screen 40-2, the object data items 52-1 through 52-3 associated with the AR marker 51 that have been displayed before are continuously displayed.

Here, the condition of continuously displaying the object data items 52-1 through 52-3 is, for example, the recognition of the AR marker 51 in the recognition frame 53 is continued for a predetermined time (for example, several seconds). This does not usually occur unless the user purposely does this, and therefore it is possible to prevent a situation where the display state is accidentally fixed due to an erroneous operation. Furthermore, another example of the condition is that the display is continued when another operation is received (for example, input of predetermined voice sound, a button operation, etc.), while the AR marker 51 is recognized in the recognition frame 53. Accordingly, the operation is differentiated from a single operation, and the operation is prevented from being confused with other operations (erroneous recognition).

Furthermore, another example of the condition is that the display is continued by touching (a predetermined operation such as tapping or flicking, etc.) only the object data 52 that the user desires to continue displaying, while the AR marker 51 is recognized in the recognition frame 53. Note that by performing the same operation again, the same object data 52 may be hidden.

Note that in the example of FIGS. 11A and 11B, the recognition frame 53 may be constantly displayed at a position set in advance in the display control process according to the present embodiment, or the recognition frame 53 may be displayed when the AR marker 51 is recognized. Furthermore, one or more recognition frames may be displayed at different positions or in different shapes, according to the scenario and scene set by the user.

Figure 12B:
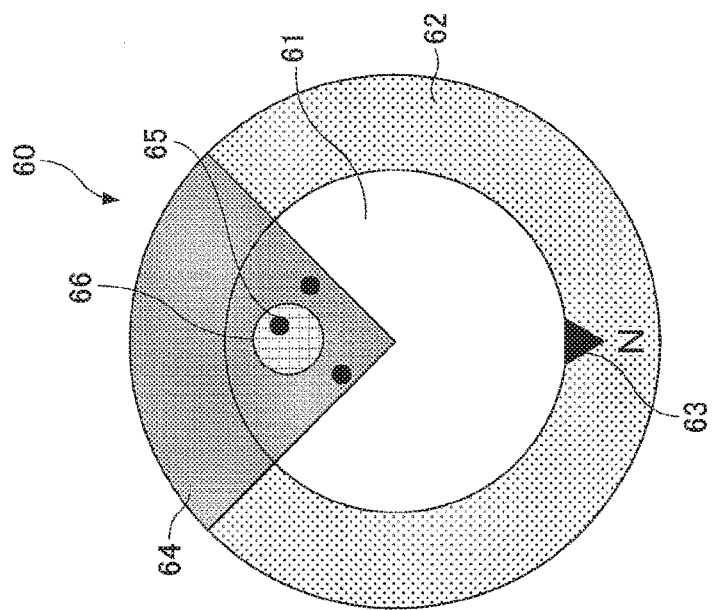
FIGS. 12A and 12B illustrate an example of a screen of the display control process according to an embodiment (part 2)
Figure 12A:
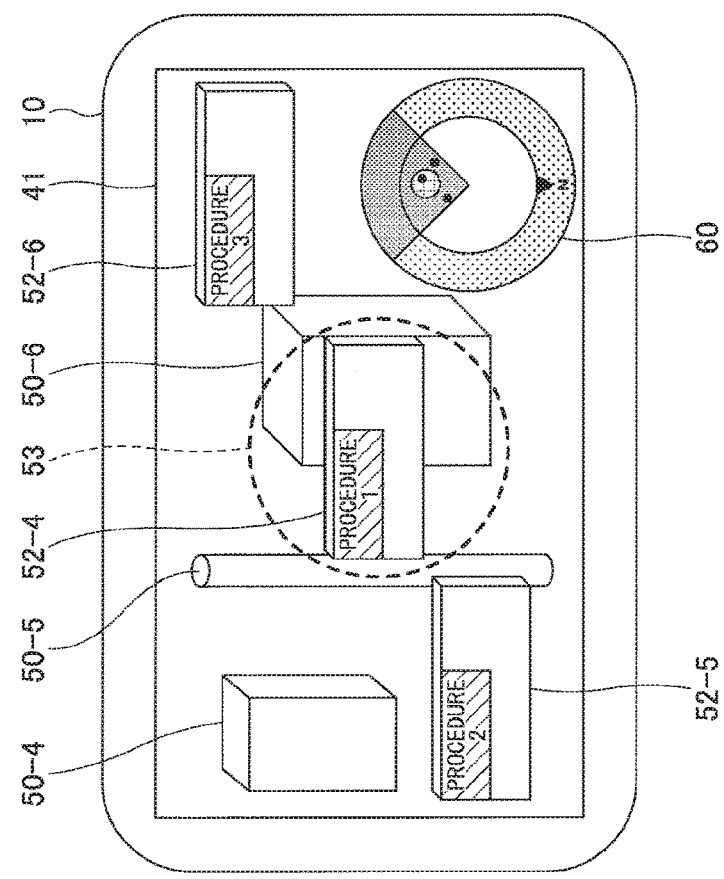

In the example of FIGS. 12A and 12B, on a screen 41 of the terminal 10, AR object data items 52-4 through 52-6 corresponding to positions acquired by GPS positioning, are displayed with respect to real objects 50-4 through 50-6. Furthermore, in the example of FIGS. 12A and 12B, as a recognition frame 53 of a predetermined range, a circular recognition frame is displayed on the screen 41.

Furthermore, in the example of FIGS. 12A and 12B, a radar map 60 is displayed, which displays the position information of the object data items 52-4 through 52-6 arranged around the position of the terminal 10 or the imaging unit 12 at the center. In the example of FIG. 12A, it is possible to set the display range of the object data 52, and therefore it is possible to set a range to be continuously displayed in a spatial manner. This is because, for example, when displaying the object data 52 based on position information and orientation information of the terminal 10 by using GPS, the object data 52 is set at a unique position (latitude, longitude, altitude) in the world coordinate system, and therefore there is no limitation such as a "recognition range" as in the case of an AR marker, a real object, etc.

As illustrated in FIG. 12B, the radar map 60 includes an AR content information display area 61, an AR content information non-display area 62, azimuth direction information 63, and an eyesight area 64, with respect to the entire display range (may be set within 50 m through 200000 m). Position information items 65 (symbols) of object data items corresponding to the AR content information within a predetermined radius, are displayed on the radar map 60.

The AR content information display area 61 displays the symbol 65 for an object that is present within a predetermined distance (for example, a radius of 10 m, a radius of 1 km, etc.), in the surrounding 360° centering around the position information of the terminal 10. For example, when the symbol 65 is present within the AR content information display area 61 and also within the eyesight area 64, the corresponding object data is displayed on the screen.

The AR content information non-display area 62 displays the symbol 65 that is further away than the AR content information display area 61 and present within a predetermined distance (for example, a radius of 20 m, a radius of 2 km, etc.), in the surrounding 360° centering around the position information of the terminal 10. For example, even if the symbol 65 is present within the eyesight area 64, if the symbol 65 is present within the AR content information non-display area 62, the corresponding object data is not displayed on the screen.

The azimuth direction information 63 is information of a predetermined azimuth direction (for example, "north", etc.), which is used as a reference for confirming the direction of the eyesight range of the terminal 10. The eyesight area 64 is an area specified according to the position and the orientation of the terminal 10, and corresponds to, for example, the display contents on the screen 41. For example, the range of the eyesight area 64 may be changed according to the imaging range (angular field information) of the imaging unit 12, the distance that may be detected, etc.

Furthermore, in the radar map 60, a recognition frame 66 is also displayed. Therefore, the user is able to set the object data to be continuously displayed, also in consideration of the depth direction. For example, in the example of FIGS. 12A and 12B, even when there are object data items that are overlapping on the screen 41, it is possible to select object data in consideration of the depth direction by using the radar map 60.

In the example of FIGS. 12A and 12B, by continuously recognizing the object data (for example, object data 52-4) in the recognition frame 53 for a predetermined time, it is possible to fix the display state (continue the display) of only the object data 52-4.

Figure 13A:
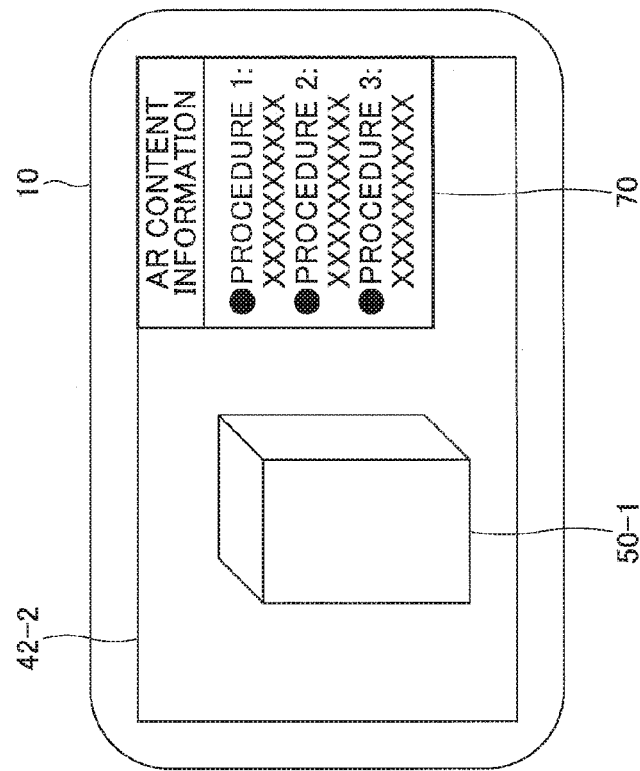
FIGS. 13A and 13B illustrate an example of a screen of the display control process according to an embodiment (part 3)
Figure 13B:
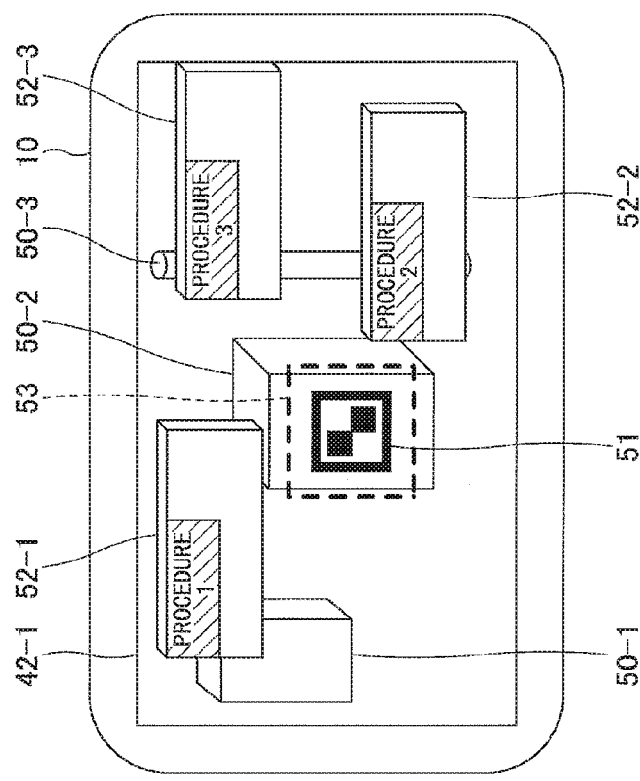

In the example of FIGS. 13A and 13B, on a screen 42-1 of the terminal 10, the same screen as that of FIG. 11A described above is displayed. For example, when the terminal 10 is moved in the mode for continuing the display, the object data remains to be fixed on the screen 42-1, and therefore the position information of the object data 52-1 through 52-3 is no longer needed (does not have to be displayed at a relative position from the AR marker 51). Therefore, in the present embodiment, as illustrated in FIG. 13B, the object data 52 may be displayed in a list 80 at the edge of the screen 42-2 of the terminal 10.

Different lists 80 on the screen 42-2 may be displayed for each person who set the object data 52-1 through 52-3, or for different real objects 50. Furthermore, as the user performs a predetermined operation such as clicking (tapping, etc.) the list 80, the object data 52-1 through 52-3 may be displayed as illustrated in FIG. 13A. The display control of the above list 80 is executed by, for example the display control unit 18.

In the example of FIGS. 14A through 14C, as illustrated in FIG. 14A, real objects 50-7 through 50-9 are displayed on a screen 43-1, and object data 52-7 through 52-10 is displayed at predetermined positions in association with an AR marker 51 recognized in the captured image on the screen 43-1. In this case, instead of an AR marker, particular object data may be continuously displayed for a predetermined time in the recognition frame 53, and it is possible to implement control to display or hide only this object data, or display object data other than this object data.

In the example of FIG. 14A, the object data 52-9 is included in the recognition frame 53, and when a predetermined condition is satisfied, even when the AR marker 51 is no longer recognized on the screen 43, as illustrated on the screen 43-2 of FIG. 14B, it is possible to continue displaying the object data 52-9 that has been in the range of the recognition frame 53.

Furthermore, in the present embodiment, when the same operations as above are performed according to a user's setting, as illustrated on the screen 43-3 of FIG. 14C, according to the setting contents, it is possible to hide only the object data 52-9 that has been in the recognition frame 53, and the display state of the other object data 52-7, 52-8, 52-10 may be fixed (continue to be displayed).

Furthermore, in a case of deleting any one of the object data items 52 among the object data items that are the targets of fixed display, the display control unit 18 may use the recognition frame 53 for deleting, and implement control of sequentially deleting the AR contents that have been continuously displayed for a predetermined time in the recognition frame 53. Accordingly, it is possible to delete the object data starting from the object data for which the operation is completed and that is no longer needed. Therefore, the user is able to easily recognize how far the operations have proceeded (recognize the object data items for which operations are not completed).

Note that in the case of using the recognition frame for deleting, the recognition frame needs to be moved to the object data that is the target of deletion. Therefore, the display control unit 18 may move the recognition frame to the top, bottom, left, and right of the screen, by using voice sound, screen operations of the terminal 10, and a user interface for HMD. Furthermore, the examples of screens of FIGS. 11A through 14C are described as a screen of a tablet terminal, etc.; however, the screen is not so limited, and a screen of a wearable computer such as HMD, etc., may be applied. In the case of HMD, etc., voice sound, etc., may be input instead of operating the screen.

As described above, according to the present embodiment, it is possible to display a content (object data) according to the status of the user. In the present embodiment, for example, when HMD is being used, an AR content may be continuously displayed by methods other than using gestures. Furthermore, the present embodiment is also applicable to positioning by object recognition, GPS, lb etc., other than an AR marker. The present embodiment is also applicable to, for example, location base AR using position information from GPS, etc., other than AR (vision base AR) using an AR marker.

According to an aspect of the embodiments, it is possible to display object data according to the status.

The present invention is not limited to the specific embodiments described herein, and variations and modifications may be made without departing from the scope of the present invention. Furthermore, all of or some of the elements in the above embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display control method executed by a computer, the display control method comprising:
    acquiring an image captured by a camera;
    displaying and superimposing first object data in the captured image on a screen when a first position associated with the first object data is included in an area specified according to a position and an orientation that have been detected, and also displaying a map including a symbol of the first position of the first object data associated with the first position on the screen; and
    continuously displaying, on the screen, the first object data, when the first object data is continuously detected as being included in a predetermined range in the captured image for a predetermined time, even after the first position is no longer included in the area.

2. The display control method according to claim 1, further comprising:
    continuously displaying second object data displayed on the screen that is object data other than the first object data, when the first object data is continuously included in the predetermined range for the predetermined time.

3. The display control method according to claim 1, further comprising:
    displaying a frame having a predetermined shape corresponding to the predetermined range, on the screen.

4. A non-transitory computer-readable recording medium storing a display control program that causes a computer to execute a process, the process comprising:
    acquiring an image captured by a camera;
    displaying and superimposing first object data in the captured image on a screen when a first position associated with the first object data is included in an area specified according to a position and an orientation that have been detected, and also displaying a map including a symbol of the first position of the first object data associated with the first position on the screen; and
    continuously displaying, on the screen, the first object data, when the first object data is continuously detected as being included in a predetermined range in the captured image for a predetermined time, even after the first position is no longer included in the area.

5. An information processing apparatus comprising:
    a processor configured to execute a process including
    acquiring an image captured by a camera;
    displaying and superimposing first object data in the captured image on a screen when a first position associated with the first object data is included in an area specified according to a position and an orientation that have been detected, and also displaying a map including a symbol of the first position of the first object data associated with the first position on the screen; and
    continuously displaying, on the screen, the first object data, when the first object data is continuously detected as being included in a predetermined range in the captured image for a predetermined time, even after the first position is no longer included in the area.

* * * * *